United States Patent [19]

Eichenbaum et al.

[11] Patent Number: 4,859,023
[45] Date of Patent: Aug. 22, 1989

[54] SHEATHED OPTICAL FIBER CABLE

[75] Inventors: Bernard R. Eichenbaum, Lilburn; Manuel R. Santana, Doraville, both of Ga.

[73] Assignee: American Telephone and Telegraph Company, AT&T Bell Laboratories, Murray Hill, N.J.

[21] Appl. No.: 304,203

[22] Filed: Sep. 21, 1981

[51] Int. Cl.$^4$ .............................................. G02B 6/44
[52] U.S. Cl. .................................................. 350/96.23
[58] Field of Search ..................................... 350/96.23

[56] References Cited

U.S. PATENT DOCUMENTS 4,078,853  3/1978  Kempf .
4,141,623  2/1979  Dubost et al. .
4,241,979  12/1980  Gagen et al. .
4,259,540  3/1981  Sabia .

FOREIGN PATENT DOCUMENTS 0031972  7/1981  European Pat. Off. .
1506967  1/1976  United Kingdom .
1576339  11/1977  United Kingdom .
2017335  10/1979  United Kingdom .

OTHER PUBLICATIONS

Characteristics of Jelly-Filled Optical Cables; H. Horima et al; *Journal of Optical Communication;* 1980; pp. 58–63.
Microbending Loss in Optical Fibers; W. B. Gardner; *The Bell System Technical Journal;* vol. 54, No. 2; Feb. '75; pp. 457–465.

*Primary Examiner*—William L. Sikes
*Assistant Examiner*—Robert E. Wise
*Attorney, Agent, or Firm*—James H. Fox

[57] ABSTRACT

Optical fiber cables have an inner sheath extruded or otherwise applied to surround optical fibers. If the fibers are coupled to the sheath, substantial shrinkage of the sheath during manufacturing induces microbending losses in the optical fibers. The inventive technique involves choosing a sheath material having a low viscoelastic modulus, typically PVC, and the application of tension thereto during or after extrusion that prevents such shrinkage. This approach typically avoids the necessity of including longitudinal compressive strength members in the cable. A filled optical fiber cable having a flexible gel to prevent water entry advantageously uses the present technique.

12 Claims, 1 Drawing Sheet

SHEATHED OPTICAL FIBER CABLE

BACKGROUND OF THE INVENTION

1. Field of the Invention

This invention relates to a method of producing optical fiber cable having one or more optical fibers surrounded by a sheath.

2. Description of the Prior Art

In the manufacture of optical fiber cables, one or more optical fibers are typically surrounded by sheathing and strength members, as required, to enable manufacture, installation, and operation of the cable while preventing damage to the optical fibers. For example, steps are typically taken to prevent buckling of the optical fibers due to compressive longitudinal forces during manufacturing or subsequently during the lifetime of the cable, in order to prevent significant microbending losses from occurring. Microbending losses increase the attenuation of the optical radiation in the fibers, limiting the length of transmission in a fiber; see, for example, Gardner, "Microbending Loss in Optical Fibers", *Bell System Technical Journal*, Vol. 54, No. 2, pages 457-465, February 1975. One type of cable construction is shown in U.S. Pat. No. 4,241,979, coassigned with the present invention. In that cable, microbending losses are substantially reduced or prevented by decoupling the optical fibers from the surrounding cable. That is, the optical fibers, typically formed into ribbons, are placed inside an inner sheath with sufficient space between the ribbons and the sheath to prevent longitudinal forces from the sheath from substantially acting on the fibers. In addition, the ribbons are given a slight twist to reduce bending stresses.

To prevent the entry of water into cables, including optical fiber cables, a filling compound can be used to fill the spaces surrounding the fibers inside the cable; see, for example, U.S. Pat. No. 4,259,540, coassigned with the present invention. The resultant cable is often referred to as a "filled cable". The filling compound is typically in the form of a gel which allows for flexibility of the cable while preventing significant water entry. However, when used with optical fiber cables, filling compounds may couple the optical fibers to the surrounding sheath so that longitudinal stresses in the sheath are transmitted to some degree to the fibers. Therefore, if contraction of the sheath occurs during the manufacturing process, or during the service life of the cable, filled cables can produce an unsatisfactorily high degree of microbending losses for the optical fibers therein. Such contraction is more likely to be significant when the sheath is made of polymeric material, as is typical in the art.

In the past, to prevent such stresses being transmitted to the optical fibers, strength members (for example, longitudinal steel wires) have been included in filled optical fiber cables to prevent substantial contraction from occurring during manufacture. Such strength members are typically located within the center of the cable, or within a cluster of optical fibers, or embedded in the polymer inner sheath. However, the above method has significant drawbacks. For example, in many cases it is desirable to avoid the added complexity and weight that reinforcing members require. Further, such members complicate the design of gripping hardware required for installation. Therefore, it is desirable to find an alternate method of making an optical fiber cable having a sheath surrounding, and coupled to, one or more optical fibers that eliminates or substantially reduces microbending losses in the fibers.

SUMMARY OF THE INVENTION

We have invented a method of making an optical fiber cable whereby a sheath of polymeric material is applied so as to surround one or more optical fibers. The sheath is coupled to at least one of the fibers, typically by a filling compound that is provided within the sheathing in the interstices between the fibers. The inventive method comprises choosing a sheathing material having a sufficiently small equilibrium viscoelastic modulus so that substantially zero buckling of the fibers is produced, and also maintaining a longitudinal tension on the sheath until the equilibrium modulus is obtained. The inventive cable obtained thereby typically contains no member within, or embedded in, the inner sheath, that is under a substantial compressive longitudinal stress during the manufacture or expected service conditions of the cable.

DETAILED DESCRIPTION

The following detail description relates to a method of making optical fiber cable. The present method is advantageously applied to reduce microbending losses during manufacture whenever an inner sheath is substantially coupled to optical fibers located therein. Such coupling is produced, for example, when a filling compound is introduced during manufacture into the interstices between the fibers.

Figure 1:
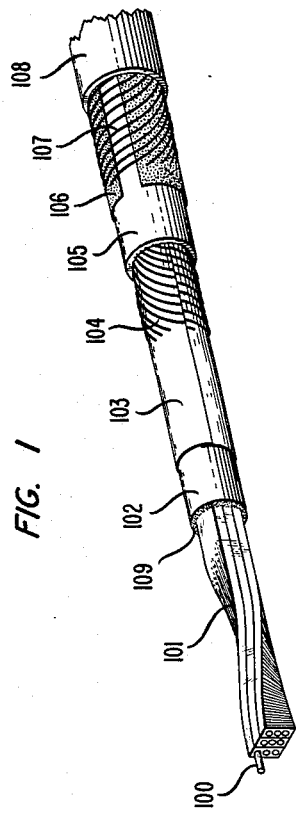
FIG. 1 shows a typical optical fiber cable made according to the inventive process.

Shown in FIG. 1 is a typical optical fiber cable produced according to the inventive technique. The basic design of this cable is otherwise explained in the above-noted U.S. Pat. No. 4,241,979. In this cable, inner sheath 102 is extruded or otherwise formed onto optical fibers 100 that are formed into ribbons 101. A filling compound 109 is placed in the sheath, typically during extrusion of the sheath onto the ribbons, with the compound thereby coupling the inner sheath onto the ribbons. Other sheathing and various strength members 103-108 are provided surrounding the inner sheath, as further explained in the above-noted patent. For purposes of the present invention, the term "inner sheath" means the first sheath that is formed onto an optical fiber or ribbons thereof, and includes the case wherein only one sheath is present in a cable. As used hereafter, the term "optical fiber" is meant to include both coated and uncoated optical fibers. Such fibers may be formed into ribbons or other configurations wherein a multiplicity of fibers are joined together prior to forming a sheath, which is typically cylindrical in shape, thereon.

When filling gel compound is provided in the cable, typically the coefficient of coupling between the inner sheathing and the fibers is substantially one. That is, a 1 percent longitudinal contraction in the inner sheath produces a 1 percent longitudinal compression of the optical fibers. Since the glass, of which optical fibers are typically made, is substantially incompressible, the compression of the optical fiber is usually accomplished by buckling of the fibers, which induces the above-noted microbending losses. The present invention is often advantageously practiced whenever the coefficient of coupling exceeds 0.1, and in some cases is advantageous at 0.01 or at coefficients even below that value. In the case of multimode optical fibers, typically a multiplicity of fibers is provided within a cable. However, in some cases, especially in the case of single-mode optical fibers, only one fiber may be present within a cable. The present invention can be advantageously practiced in either case. Also, the inner sheath may be coupled to a fiber or fibers without the presence of a filling compound. It can be seen that the present invention can be practiced in such situations also.

For purposes of the present invention, the term "substantially zero buckling" is defined in terms of the allowable degree of added losses due to microbending of an optical fiber as compared to the loss in the absence of microbending. In present manufacturing operations, it is desirable to prevent microbending losses from exceeding 10 percent of the optical fiber loss prior to cabling, and preferably less than 5 percent. For example, a multimode optical fiber having a loss of 6 dB/km at a radiation wavelength of 0.85 micrometers prior to cabling should have added losses due to microbending of less than 0.6 dB/km and preferably less than 0.3 dB/km following the cabling operation. Other added losses present during manufacturing (for example, splice losses) are not included in this amount. To cite another example, a single-mode optical fiber operating at 1.3 micrometers wavelength should typically have added losses due to microbending of less than 0.1 dB/km and preferably less than 0.05 dB/km.

The present invention obtains low microbending losses during manufacture of optical fibers, wherein an inner sheath is extruded onto one or more fibers by firstly choosing a sheathing material with a high creep compliance. Secondly, a load is maintained on the cable after extrusion so that the thermal contraction of the sheath is offset by the creep. This load is maintained until a substantially zero equilibrium longitudinal stress is obtained for the inner sheath.

In order to formulate a quantitative description of this method of buckling avoidance, a linear thermoviscoelastic analysis is made. As persons of skill in the art will recognize, various interrelated terms are conventionally used in describing the behavior of polymeric material in the presence of stress or strain. The term "viscoelastic modulus" is the modulus of the material as a function of time, which accounts for viscous (fluid) flow of the polymer material. When the effects of temperature on modulus are also included, the term "thermoviscoelastic modulus" is used. The term "creep compliance" is a measure of strain in the material as a function of an applied constant stress. It is also typically a function of time and temperature. The term "relaxation modulus" is also frequency used, and is a measure of the stress in the material for an applied constant strain. It also is typically time and temperature dependent.

A sufficient condition for avoiding fiber buckling is to have the longitudinal load carried by the sheath to be less than the total longitudinal load on the cable (the core within the sheath must carry some of any load) for all times after coupling. That is, if $\sigma(\vec{x}, t)$ is the instantaneous longitudinal stress at some point $\vec{x}$ in the sheath at time t, then to avoid fiber buckling it is sufficient to have $$F(t) > \int_{A_s} \sigma(\vec{x}, t) dA \qquad (1)$$

for all time coupling, where F(t) is the instantaneous longitudinal load on the cable, and $A_s$ is the sheath cross section. Any excess on the left-hand side of Inequality (1) is carried by the fibers and associated materials in the core.

The instantaneous stress in a thermoviscoelastic material is dependent on its history as well as current state: first, ignoring temperature changes we have, for any point $\vec{x}$, $$\sigma(x, t) = \int_{t_o}^{t} E(t - \tau) \frac{d\epsilon(\tau)}{d\tau} d\tau, \qquad (2)$$

where E is the elastic modulus and usually decreases monotonically with increasing argument, $\epsilon$ is the instantaneous mechanical strain at time $\tau$, and $t_o$ is the earliest time in the history of the sample which is relevant to the determination of $\sigma$, e.g., the time when core-sheath coupling begins.

Upon combining (1) and (2), we obtain $$F(t) > \int_{A_s} \int_{t_o}^{t} E(t - \tau) \frac{d\epsilon(\tau)}{d\tau} d\tau \, dA \qquad (3)$$

as a sufficient condition for no lightguide buckling.

As the sheath cools after extrusion, the thermal contraction of the sheath occurs at a rate of $\alpha(T) \, dT/dt$, where T is the instantaneous temperature, and $\alpha$ is the thermal expansion coefficient at T. To avoid fiber buckling, we offset this contraction by a mechanical strain, which can be produced by a longitudinal load (stress). If we match mechanical strain rate to thermal contraction rate, we have $$\frac{d\epsilon}{dt} + \alpha \frac{dT}{dt} = 0. \qquad (4)$$

Now we can write $$F(t) > - \int_{A_s} \int_{t_o}^{t} E(t - \tau)\alpha(T) \frac{dT}{d\tau} d\tau \, dA \qquad (5)$$

as a sufficient condition for no fiber buckling.

Equation (2) does not explicitly include temperature changes, but it is clear from the nature of Equation (5), with its explicit temperature dependence, that Equation (2) must be generalized to account for temperature changes:

$$\sigma(t) = \int_{t_o}^{t} E\left[ \int_{\tau}^{t} \frac{dt'}{a_T(T - T_o)} \right] \frac{d\epsilon(\tau)}{d\tau} d\tau. \qquad (6)$$

The new argument of E, $dt'/a_T(T-T_o)$, is called the reduced time. It represents the effective time difference and is calculated by applying a temperature-dependent weight function, $a_T^{-1}$, to the clock-time delay between strain generation and stress evaluation. This more generalized form leads to a more generalized version of Equation (5), the condition for no buckling, which is $$F(t) > - \int_{A_s} \int_{t_o}^{t} E\left[\int_{\tau}^{t} \frac{dt'}{a_T(T(t) - T_o)}\right] \alpha(T) \frac{dT(\tau)}{d\tau} d\tau \, dA. \quad (7)$$

We now separate the time integral in Inequality (7) into two time intervals:

(when $T \to$ room temp)
$$\int_{t_o}^{t} = \int_{t_o}^{t_r} + \int_{t_r}^{t} \quad (8)$$

In the case of $t > t_r$, the second integral on the righthand side (rhs) of Equation (8) vanishes since $dT/d\tau = 0$ within its limits. In general, $F = F(t)$ even after $t_r$ since $E = E(t)$. However, after a certain amount of time, the value of E inside the first integral in Equation (8) can, for some materials, be epproximated by a material constant, the equilibrium modulus ($E_e$). In such cases, F becomes a constant, and we can rewrite Inequality (7) as $$F > -E_e \int_{A_s} \int_{t_o}^{t_r} \alpha(T(\tau)) \frac{dT(\tau)}{d\tau} d\tau \, dA \quad (9)$$

for t sufficiently $> t_r$. Or, because all functions here are everywhere differentiable, $$F > -E_e \int_{A_s} \int_{T_o}^{T_r} \alpha(T) \, dT \, dA. \quad (10)$$

If we now ignore the dependence of temperature on radius and azimuth within the sheath wall and evaluate the inner integral in terms of a mean $\alpha = \bar{\alpha}$, then $$F > E_e A \bar{\alpha} \Delta T \quad (11)$$

where $\Delta T = T_o - T_r$, and A is the sheath cross section area.

We now have completed the quantitative description we were seeking, being embodied in Inequality (7) and the important special case of Inequality (11). Inequality (7) instructs that as long as a load, F(t), is applied to the sheath at all times t and is greater than the integral on the rhs, then buckling of the fibers cannot occur. Note that this required load is not only dependent on the instantaneous values of time-dependent parameters, but also on the history of those parameters. If we wait until the sheath is at room temerature and if an equilibrium modulus can be ascribed to the sheath material, then the required load, F, to prevent fiber buckling is no longer time dependent, and it can be determined from the simpler expression, Inequality (11).

Indeed, if the equilibrium modulus is essentially zero, then after it is reached there is no need to maintain a load to prevent fiber buckling. This behavior is what we were seeking: there is no remaining driving force to cause fiber buckling. The term "equilibrium", as used herein, refers to the state of the sheath, at a sufficiently long time after extrusion, such that substantially no further change in the modulus occurs over the life of the cable. Thus, upon release of the longitudinal load, if the equilibrium modulus ($E_e$) is low, substantially no shrinkage occurs, and substantially zero compressive force is imparted to the fibers. The equilibrium is usually attained upon cooling the extruded sheath to room temperature, but further relaxation can also occur after that time in some cases. How quickly a material reaches its $E_e$ and how low is its value are considerations of critical practical importance. The time should be reasonably short, on the order of processing time, and $E_e$ should be close to zero.

A material that has been found to be suitable in this regard for use as an inner sheath is poly(vinyl chloride) (PVC). The extrusion process employing the inventive technique is further illustrated by means of the example below.

EXAMPLE

Figure 2:
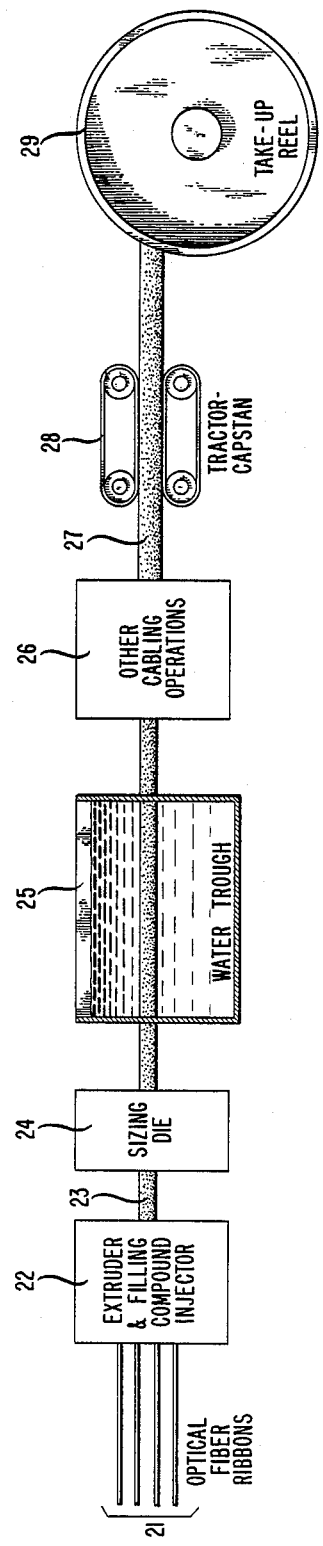
FIG. 2 illustrates a typical sheath extrusion process employing the inventive method.

Referring to FIG. 2, optical fiber ribbons 21 pass through extruder 22 wherein the filling compound is injected. This filling compound advantageously has the composition listed in Table I below. The extruder also extrudes inner sheath 23 onto the ribbons having the filling compound located in the interstices therein, and the sheath then passes through sizing dye 24. The outer diameter of the sheath is approximately 0.310 inches (7.87 mm), and the inner diameter is approximately 0.250 inches (6.35 mm). The sheath is extruded at a temperature of approximately 193 degrees Celsius, at a speed of about 5.9 inches (15 cm) per second. The composition of the sheath material is given in Table II below. The sheath is then cooled by passing through water trough 25, approximately 40 feet long. A temperature of the water within a range of 50 to 70 degrees Fahrenheit (10 to 21 degrees Centigrade) is suitable. Other cable layers, which can include other sheaths, strength members, armor layer, outer jacket, etc., are then applied, as shown schematically at 26. The cable then passes through tractor capstan 28, which maintains a suitable tension on the sheath to prevent the above-noted contraction. It has been found that a tension force on the sheath of approximately 0.5 to 1 pound (2.2 to 4.4 Newton) is suitable in this regard. The cable then passes over takeup reel 29. It has been found that an elapsed period of approximately 90 seconds from the extrusion of the inner sheath to the exit from the tractor capstan is sufficient so that the PVC sheath has substantially fully relaxed; that is, substantially no compressive stress is present in the sheath, and therefore substantially no microbending losses are induced in the optical fibers therein.

TABLE I

| Filling Gel Composition | |
|---|---|
| Components | (Parts by Weight) |
| Styrene-ethylene-butylene block copolymer (Kraton G 1650) | 7 |
| Mineral oil (napthenic) (Drakeol 35) | 93 |
| Antioxidant (Irganox 1035) | 0.2 |

TABLE II

| Sheath Composition | |
|---|---|
| Components | Parts By Weight |
| Poly(vinyl chloride) | 100 |
| Diundecyl phthalate | 30 |
| Tribasic lead sulfate | 7 |
| Antimony trioxide | 2 |
| Dibasic lead stearate | 0.4 |

TABLE II-continued

| Sheath Composition | |
|---|---|
| Components | Parts By Weight |
| N,N'—ethylene bis stearamide | 0.4 |

It is also possible to wind the sheathed cable directly onto a takeup reel prior to other cabling operations. In that case, a portion of the relaxation time required can be obtained after winding onto the reel. This reduces or eliminates the cooling required by the water trough, for example. The sheath should then be wound under sufficient tension to prevent buckling, as noted above, as the cable cools to room temperature on the reel. Other cooling and tension methods can alternately, or additionally, be employed. In the case then the other cabling operations are performed in-line as shown prior to reeling, it is desirable that the inner sheath relax to achieve substantially zero compressive stress prior to the application of the remaining cable layers. This can be readily achieved in the case of PVC for the processing times typically involved. However, even following manufacture, the layers external to the inner sheath can in some cases also support a residual compressive stress produced by the inner sheath, preventing the transmission of the stress to the fibers.

In any case, in order to prevent buckling of a typical silica optical fiber having an outside (cladding) diameter in the range of 90 to 150 micrometers, it is desirable to maintain the longitudinal compressive force transmitted to each fiber at less than 0.001 pounds (445 dynes), and preferably less than 0.001 pounds (44.5 dynes). Note that this force is a function of the residual stress of the inner sheath at equilibrium multiplied by the coupling coefficient of the sheathing to the fiber. The above-noted substantially zero stress of the inner sheath is typically obtained for a relaxation time that is less than the remaining manufacturing time of the cable following extrusion of the inner sheath; this time is typically less than 2 minutes. However, partial relaxation may occur during the sheathing operation, as noted above, with further relaxation occurring after the cable is wound onto a reel, as noted above. This is in contrast to prior art filled cable design, wherein the stress is typically maintained in the inner sheath for long periods of time following manufacturing and installation, being counteracted by reinforcing members in the cable. In the present structure, typically no member within the inner sheath, or embedded in it, maintains a substantial compressive longitudinal load under expected service conditions of the cable.

Choosing a sheath material that has a substantially zero stress at equilibrium (produced by a high creep compliance or in other words, a low viscoelastic modulus) can be accomplished according to known analysis techniques; see, e.g., "Strain Control and Stress Measurement for Relaxation", in *Creep And Relaxation Of Nonlinear Viscoelastic Materials,* W. N. Findley et al, North-Holland Publishing Company, New York (1976). Measurements of modulus as a function of the frequency of applied strain can also be used. Desirably, the value of modulus in the so-called "plateau zone" for the material is low enough to produce substantially zero buckling of the fibers; see Chapters 13–14, *Viscoelastic Properties Of Polymers,* Third Edition, J. D. Ferry, Wiley & Sons Publishers, New York (1976).

Polymeric sheathing material is typically applied by extrusion at an elevated temperature. However, a sheath can also be formed by applying a longitudinal tape, typically at room temperature; see layer 103 of FIG. 1. The relaxation of a poly(vinyl chloride) tape can occur at room temperature within a few minutes or less, depending on the composition, thickness, applied tension, etc. Other sheathing application methods can also be envisioned by those skilled in the art that advantageously utilize the present technique.

While the filled optical fiber cable of the above example is an exemplary embodiment of the present invention, it may be employed in other situations also. For example, with the recognition that a low stress sheath can be applied onto an optical fiber, the requirement of maintaining clearance between one or more fibers and the surrounding sheath is eliminated, or at least reduced, even in cables wherein a filling material is not employed. This can, for example, results in a more compact cable, or freedom in manufacturing or design, in that an inner clearance for the fibers is not required. Furthermore, while an inner sheath has been shown as the exemplary embodiment, other sheathing layers may also advantageously employ the present invention. That is, a subsequent sheathing layer can be applied onto underlying cable layers such that the sheathing is coupled to optical fibers. The present technique can advantageously be used to eliminate buckling that would otherwise occur due to applying such a sheathing layer also. As noted above, the present technique and resulting cable structure typically obviates the need for longitudinal compressive strength members. However, strength members for other purposes, such as for increasing tensile strength, can be employed. All such variations and deviations on the teaching through which the present invention has advanced the art are considered to be within the spirit and scope of the present invention.

What is claimed is:

1. A method of making an optical fiber cable by steps comprising applying a sheath of polymeric material to surround one or more optical fibers so as to couple at least one of said fibers to said sheath, characterized in that said applying of said sheath is accomplished at an elevated temperature, followed by cooling said sheath to ambient temperature, wherein said polymeric material has a creep compliance sufficiently high so that thermal contraction of said sheath is offset by creep produced by a longitudinal tension that is applied to said sheath during at least a portion of said cooling, whereby substantially zero buckling of said fibers results from said cooling of said sheath.

2. The method of claim 1 wherein the coefficient of coupling of said sheath and said at least one fiber is at least 0.01.

3. The method of claim 1 wherein said sheath is an inner sheath comprising poly(vinyl chloride).

4. The method of claim 1 wherein said tension is maintained for less than 2 minutes after the time of said applying.

5. The method of claim 1 wherein said sheath is applied by extrusion.

6. The method of claim 1 wherein said sheath is a longitudinal tape.

7. The method of claim 1 wherein said compressive stress at equilibrium produces a longitudinal compressive force of less than 445 dynes on said fibers having a cladding diameter in the range of 90 to 150 micrometers.

8. The method of claim 1 wherein the coupling of said sheath and said fibers is produced by flexible material located in the interstices within said sheath, with said material substantially preventing water entry into said sheath.

9. An optical fiber cable made according to the method of claim 1.

10. An optical fiber cable comprising an inner sheath of polymeric material surrounding one or more optical fibers and having a coefficient of coupling to at least one of said fibers of at least 0.01, characterized in that said polymeric material is chosen to have a sufficiently high creep compliance so that said sheath, in the absence of longitudinal compressive reinforcing elements within, or embedded in, said sheath, transmits to said fibers a longitudinal compressive stress small enough to result in substantially zero buckling of said fibers.

11. The cable of claim 10 wherein said inner sheath comprises poly(vinyl chloride).

12. The cable of claim 10 wherein the coupling of said sheath and said fibers is substantially produced by flexible material located in the interstices within said sheath, with said material substantially preventing water entry into said sheath.

* * * * *